United States Patent
Ideta et al.

(10) Patent No.: US 10,518,730 B2
(45) Date of Patent: Dec. 31, 2019

(54) VEHICULAR SHOCK ABSORBER

(71) Applicant: TOYOTA BOSHOKU KABUSHIKI KAISHA, Aichi (JP)

(72) Inventors: Yuuzou Ideta, Aichi-ken (JP); Keisuke Urano, Aichi-ken (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 196 days.

(21) Appl. No.: 15/892,953

(22) Filed: Feb. 9, 2018

(65) Prior Publication Data

US 2018/0236961 A1 Aug. 23, 2018

(30) Foreign Application Priority Data

Feb. 20, 2017 (JP) ................. 2017-028741

(51) Int. Cl.
*B60J 7/00* (2006.01)
*B60R 21/04* (2006.01)
*B60R 13/02* (2006.01)

(52) U.S. Cl.
CPC .......... *B60R 21/04* (2013.01); *B60R 13/0212* (2013.01); *B60R 2021/0414* (2013.01); *B60R 2021/0435* (2013.01)

(58) Field of Classification Search
CPC ..... B60R 19/18; B60R 21/0428; B60R 21/04; B60R 2021/0414; B63H 20/10; E21B 17/07; A47C 3/025; A47D 13/043; B62D 1/195; B62D 1/184
USPC .................................................... 296/187.05
See application file for complete search history.

(56) References Cited

U.S. PATENT DOCUMENTS

| | | | | |
|---|---|---|---|---|
| 3,719,297 A | * | 3/1973 | Nowicki | B60R 9/12 224/310 |
| 4,497,425 A | * | 2/1985 | Mobius | B60R 9/12 224/319 |
| 5,490,691 A | * | 2/1996 | Sinnhuber | B60R 21/013 180/274 |
| 5,564,744 A | * | 10/1996 | Frost | B60R 13/025 280/751 |
| 5,660,426 A | * | 8/1997 | Sugimori | B60R 13/0206 267/140 |
| 5,720,510 A | * | 2/1998 | Daniel | B60R 13/0206 280/751 |
| 6,309,011 B1 | * | 10/2001 | Matsuyama | B60R 13/0206 188/376 |
| 6,315,350 B1 | * | 11/2001 | Nakane | B60R 13/0225 280/751 |

(Continued)

FOREIGN PATENT DOCUMENTS

JP 2000-289650 10/2000

*Primary Examiner* — Kiran B Patel
(74) *Attorney, Agent, or Firm* — Greenblum & Bernstein, P.L.C.

(57) ABSTRACT

A shock absorber to be mounted on a vehicular exterior side of a trim member includes a plate member having a plate surface and to be mounted on a vehicular exterior surface of the trim member such that the plate surface of the plate member is along the vehicular exterior surface of the trim member, and at least two or more shock absorbing members that are arranged on a vehicular exterior surface of the plate member to be spaced from each other along the plate surface of the plate member.

11 Claims, 6 Drawing Sheets

(56) References Cited

U.S. PATENT DOCUMENTS

| | | | | |
|---|---|---|---|---|
| 6,390,539 B2* | 5/2002 | Takahara | ................ | B60R 21/04 |
| | | | | 280/748 |
| 6,397,553 B1* | 6/2002 | Horikawa | ............... | B60R 21/04 |
| | | | | 296/187.05 |
| 6,517,144 B2* | 2/2003 | Kobayashi | ............. | B60R 21/04 |
| | | | | 280/751 |
| 6,644,726 B2* | 11/2003 | Fujii | .................. | B62D 25/2072 |
| | | | | 180/309 |
| 7,360,822 B2* | 4/2008 | Carroll, III | .......... | B60N 2/4249 |
| | | | | 296/187.03 |
| 7,954,883 B2* | 6/2011 | Benkler | .................. | B60R 21/04 |
| | | | | 296/187.05 |
| 2014/0191533 A1* | 7/2014 | Takahashi | ............... | B60R 13/02 |
| | | | | 296/187.05 |

* cited by examiner

FIG.6
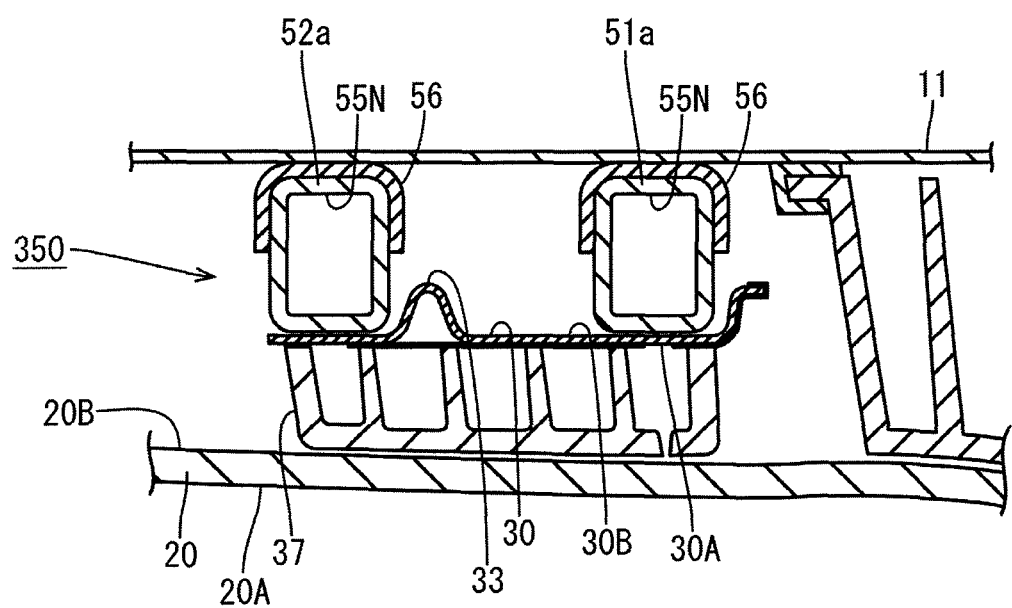
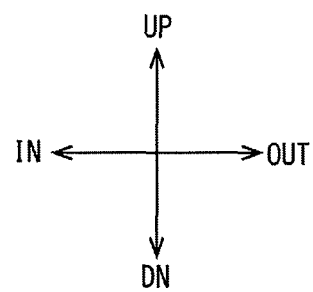

VEHICULAR SHOCK ABSORBER

CROSS REFERENCE TO RELATED APPLICATION

This application claims priority from Japanese Patent Application No. 2017-28741 filed on Feb. 20, 2017. The entire contents of the priority application are incorporated herein by reference.

FIELD OF THE INVENTION

The present disclosure relates to a vehicular shock absorber.

BACKGROUND

A vehicular shock absorbing structure including a vehicular shock absorbing member on a vehicular exterior side of a roof trim has been known. A vehicular interior side surface of the roof trim configures a vehicular interior surface of a vehicular ceiling. The roof brace is disposed on the vehicular exterior side of the roof trim to reinforce a roof panel and a shock absorbing member is included in the roof brace. The shock absorbing member is deformed to absorb shock caused by a vehicular collision and protect a passenger's head. The shock absorbing member is disposed to cover the roof brace from the vehicular interior side while having a predefined distance from the roof brace.

According to such a shock absorbing structure, the shock absorbing member is spaced a predetermined long distance corresponding to a shock absorbing stroke. Therefore, a passenger's head can be protected with high shock absorbing properties.

SUMMARY OF THE INVENTION

An objective of the present technology is to provide a shock absorber that can keep a sufficient vehicular interior space and has excellent shock absorbing properties.

According to the present technology, a shock absorber to be mounted on a vehicular exterior side of a trim member includes a plate member having a plate surface and to be mounted on a vehicular exterior surface of the trim member such that the plate surface of the plate member is along the vehicular exterior surface of the trim member, and at least two or more shock absorbing members that are arranged on a vehicular exterior surface of the plate member to be spaced from each other along the plate surface of the plate member.

BRIEF DESCRIPTION OF THE DRAWINGS

FIG. 6 is a cross-sectional view taken along line C-C in FIGS. 1 to 3.

DETAILED DESCRIPTION OF EMBODIMENT

From a viewpoint of absorbing shock, it is desirable to keep a constant shock absorbing stroke (a constant height at the ceiling). However, from a viewpoint of keeping a large interior space, it is desired to arrange the trim, which is configured as a vehicular interior surface, on the most vehicular exterior side. Therefore, a distance (a width or a height) between the trim and a vehicular panel in a vehicular interior-exterior direction is limited to some extent.

Various alternations such as changing material or a shape of the shock absorbing member have been made to exert the shock absorbing properties effectively in a section of a vehicle where a large space cannot be kept. However, the whole shock absorbing member may not collapse only by changing the material or the shape of the shock absorbing member and shock energy may not be effectively absorbed. Thus, a configuration of the shock absorbing member may require improvement.

One embodiment of the present technology will be described with reference to FIGS. 1 to 6. In each of the drawings, FR and RR represent a vehicular front side and a vehicular rear side, respectively, R and L represent a right side and a left side in a vehicular running direction, respectively, UP and DN represent an upper side and a lower side, respectively, and IN and OUT represent a vehicular interior side and a vehicular exterior side, respectively. In the following description, an upper-lower direction, a left-right direction, and a front-rear direction represent respective directions when each component is mounted on a vehicular ceiling.

Figure 1:
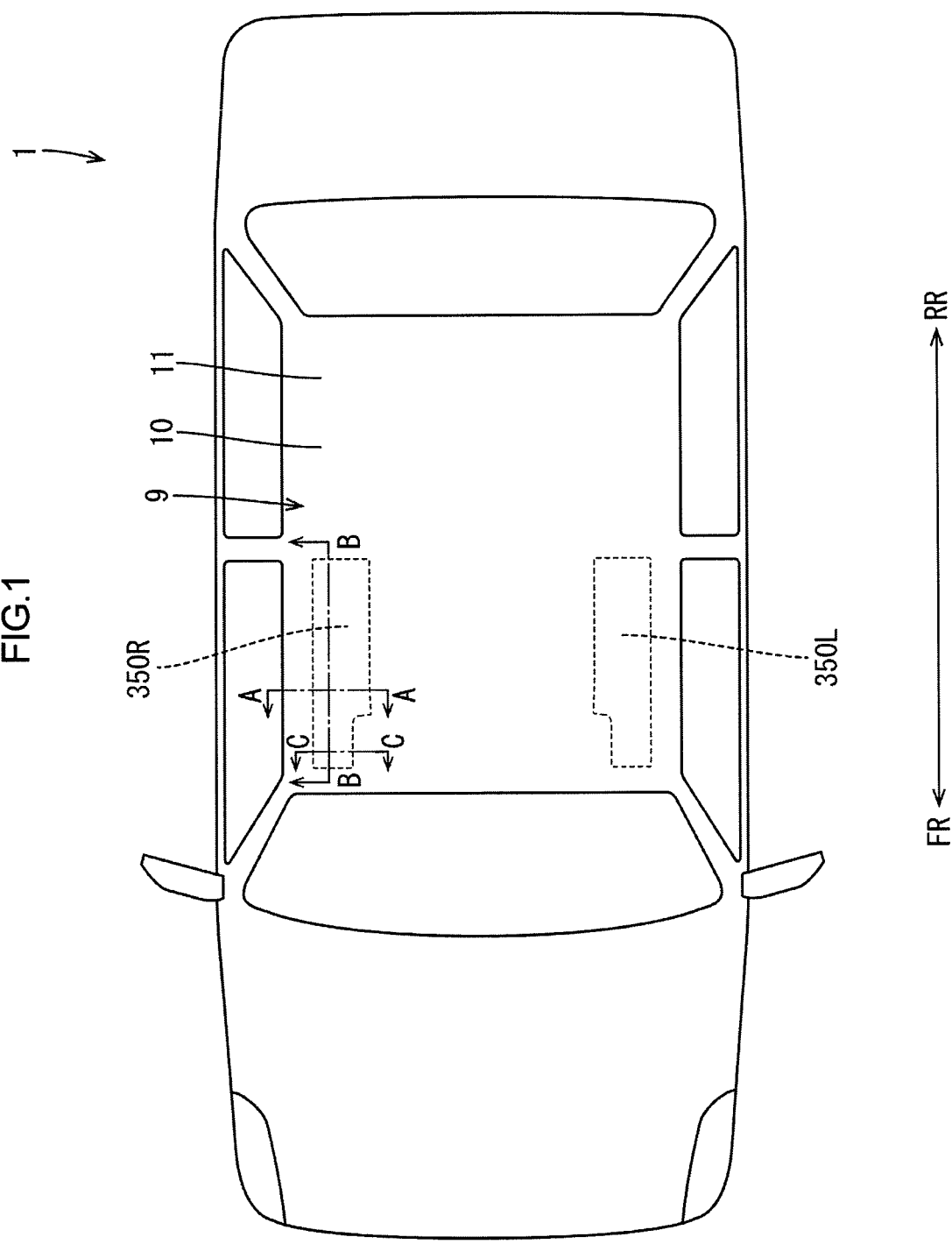
FIG. 1 is a schematic upper view of a vehicle including a vehicular shock absorber according to one embodiment of the present technology on a ceiling.
Figure 4:
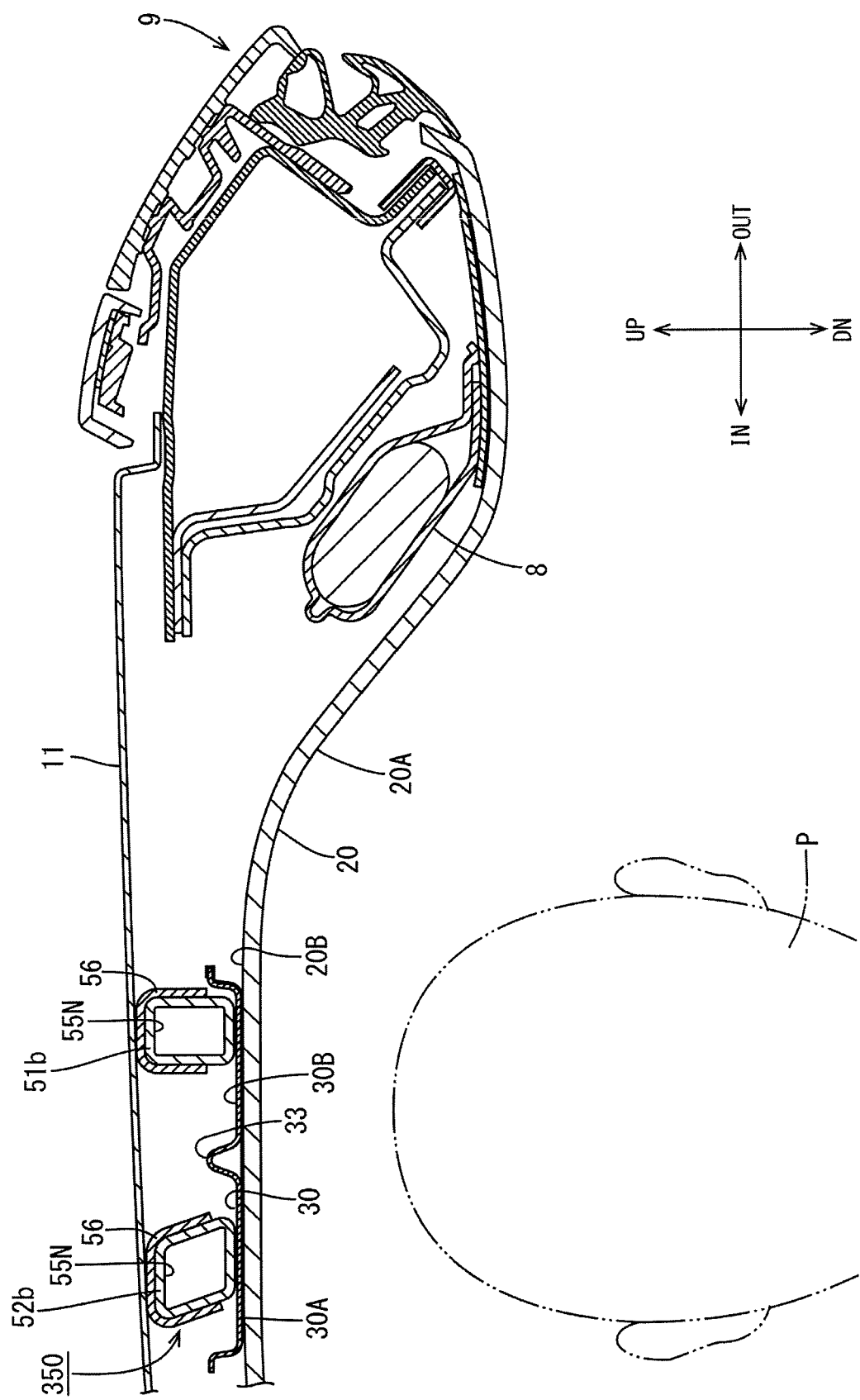
FIG. 4 is a cross-sectional view taken along line A-A in FIGS. 1 to 3.
Figure 5:
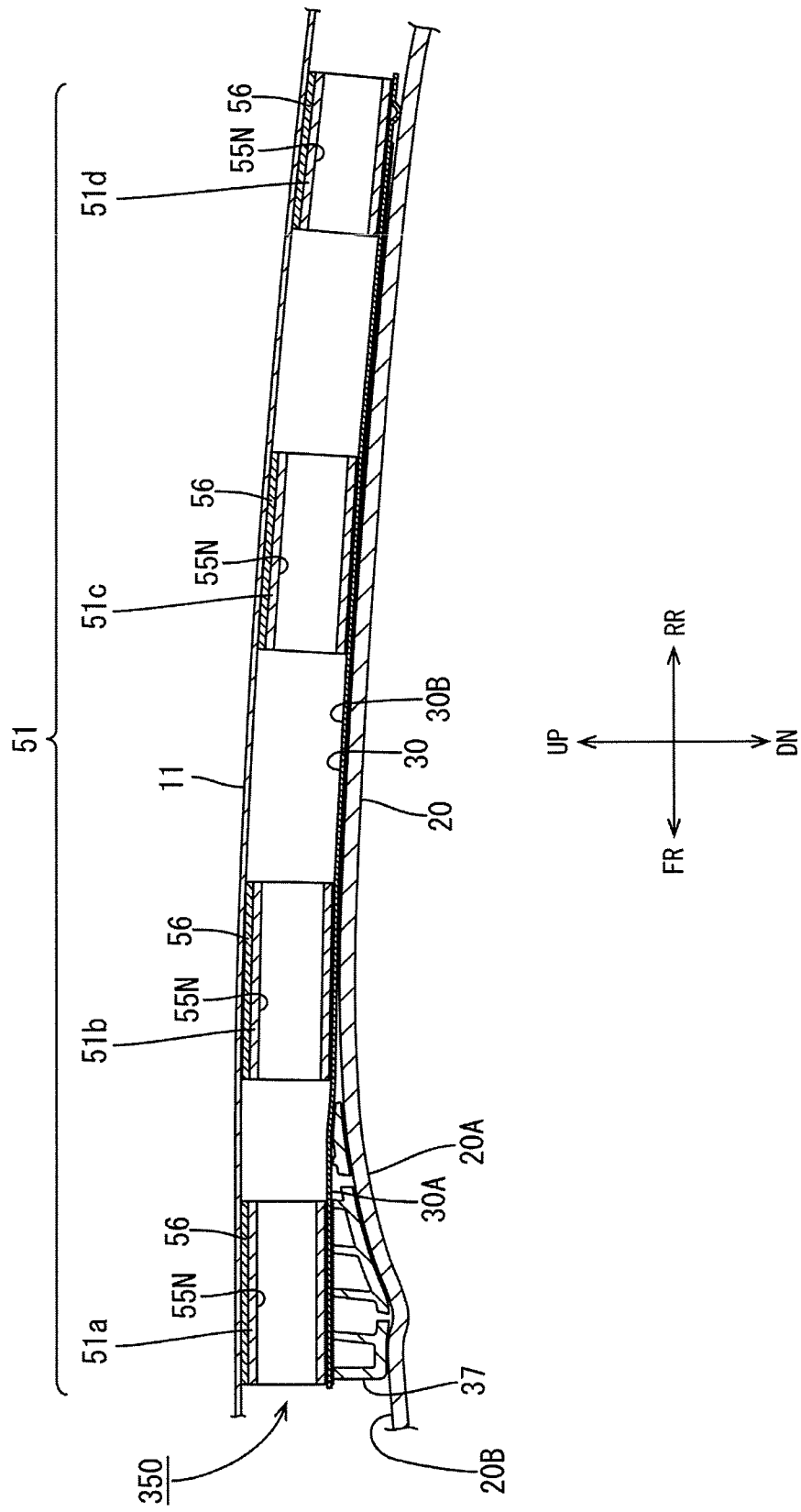
FIG. 5 is a cross-sectional view taken along line B-B in FIGS. 1 to 3.

FIG. 1 is a schematic upper view of a vehicle 1 including a vehicular shock absorbing structure on a vehicular ceiling 10. The vehicular ceiling 10 of the vehicle 1 includes a roof panel 11 that is an outer plate of a roof of the vehicle 1 and a roof trim 20 that is an interior of a ceiling surface. The roof trim 20 is configured as a vehicular interior surface. As illustrated in FIGS. 4 to 6, shock absorbers 350 are disposed on a vehicular upper and outer surface of the roof trim 20.

Figure 2:
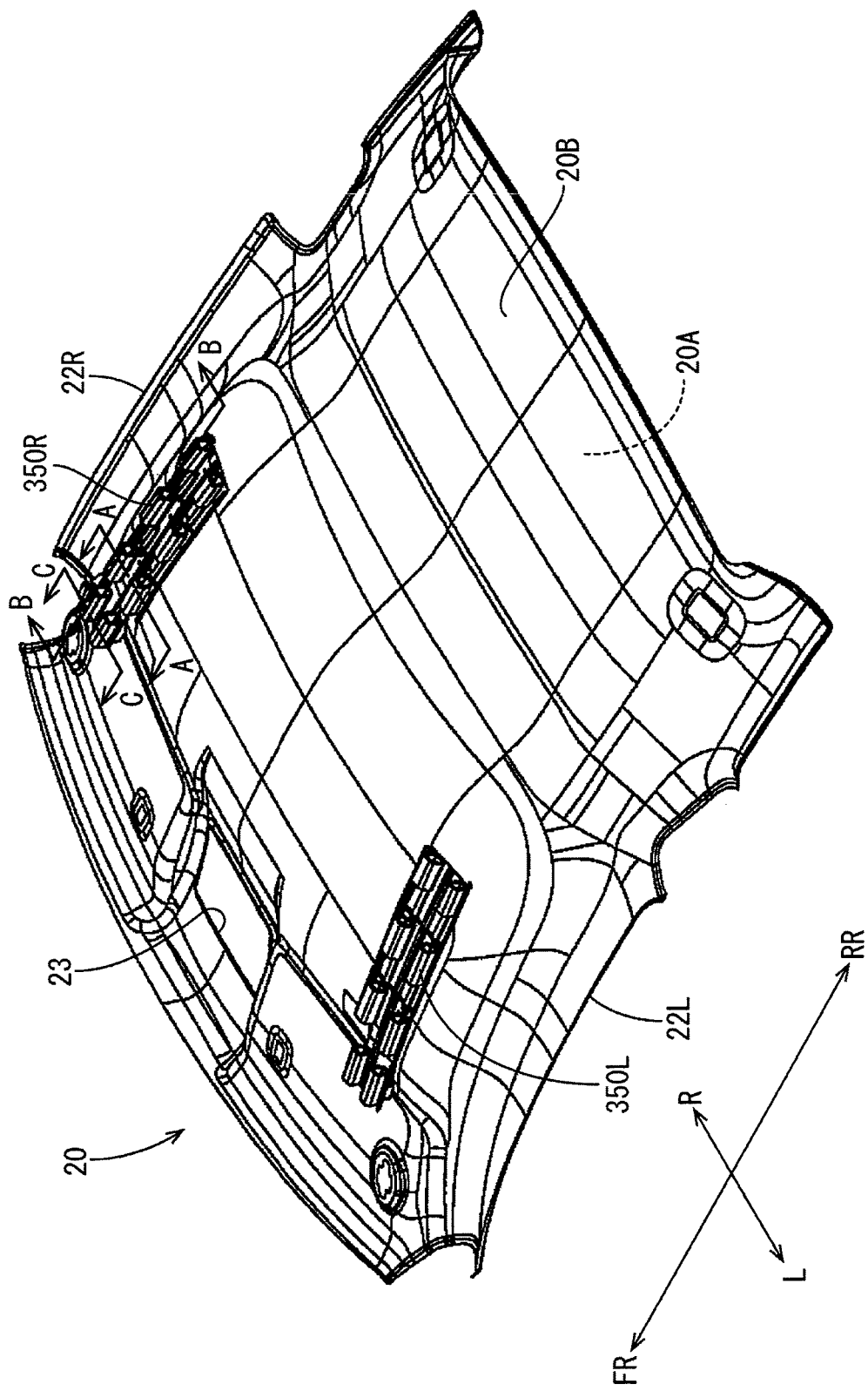
FIG. 2 is a perspective view of a roof trim including shock absorbing members.

As illustrated in FIG. 2, the roof trim 20 is a substantially rectangular plate that follows a shape of the vehicular ceiling 10. The roof trim 20 is included in the vehicular ceiling 10 such that a front surface 20A thereof faces a vehicular interior side and is a ceiling surface and a rear surface 20B thereof faces a vehicular exterior side on the vehicular upper side. The roof panel 20 has a hole 23 for mounting a room light (a room lamp or a map lamp) on a front side and in a substantially middle section thereof with respect to a vehicular width direction.

The shock absorbers 350 are arranged on a front section of the rear surface 20B of the roof trim 20, which is a vehicular exterior surface in the vehicular upward direction. The shock absorbers 350 include a right shock absorber 350R and a left shock absorber 350L on a right end 22R side and a left end 22L side, respectively, with respect to a vehicular running direction. The right shock absorber 350R and the left shock absorber 350L are arranged symmetrically. Hereinafter, a structure near the right shock absorber 350R will be described and a structure near the left shock absorber 350L, which is similar to that near the right shock absorber 350R, will not be described.

Figure 3:
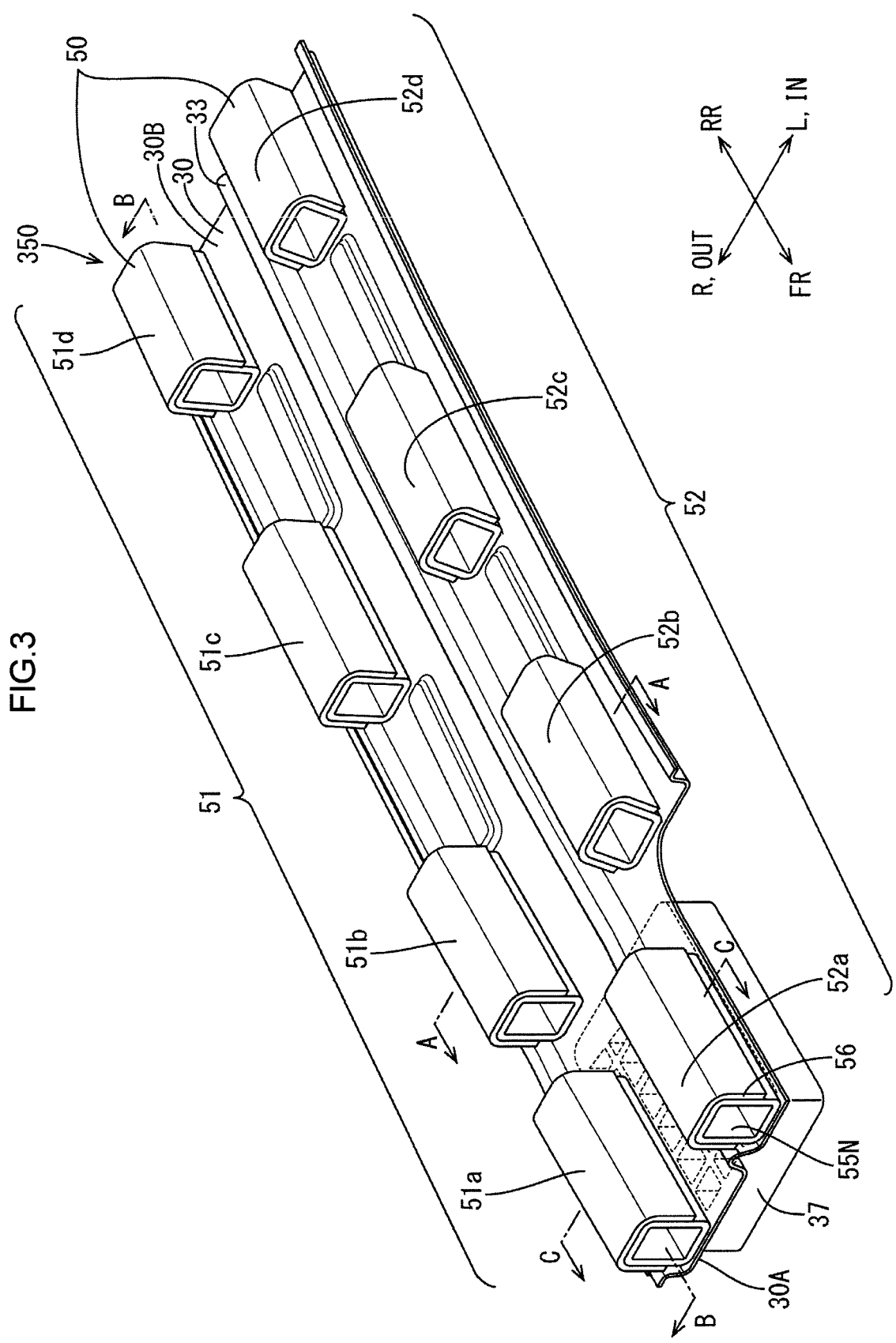
FIG. 3 is a perspective view illustrating the shock absorbing members.

As illustrated in FIG. 3, the shock absorber 350 includes a substantially rectangular plate member 30 and shock absorbing members 50 arranged on a rear surface 30B of the plate member 30. The rear surface 30B is a vehicular exterior surface in the vehicular upward direction of the plate member 30. The shock absorbing members 50 are arranged at intervals on a plate surface of the plate member 30. The shock absorbing members 50 include exterior side shock absorbing members 51 (first shock absorbing members) and interior side shock absorbing members 52 (second shock absorbing members).

The exterior side shock absorbing members 51 are disposed near an outer edge 9 of the vehicle 1 (on an a left upper side in FIG. 3 and a relatively vehicular exterior side in a vehicular upper view) as illustrated in FIGS. 3 and 4. The exterior side shock absorbing members 51 are arranged in the vehicular front-rear direction. The exterior side shock absorbing members 51 configure a first row of the first shock absorbing members. The interior side sock absorbing members 52 are disposed on the vehicular interior side (on a right lower side in FIG. 3 and a relatively vehicular interior side in a vehicular upper view) with respect to the exterior side shock absorbing members 51. The interior side shock absorbing members 52 are arranged in the vehicular front-rear direction and along the exterior side shock absorbing members 51. The interior side shock absorbing members 52 configure a second row of the second shock absorbing members.

The exterior side shock absorbing members 51 include exterior side shock absorbing members 51a, 51b, 51c, 51d sequentially from the vehicular front side. The interior side shock absorbing members 52 include interior side shock absorbing members 52a, 52b, 52c, 52d sequentially from the vehicular front side. The exterior side shock absorbing members 51 have rigidity relatively greater than the interior side shock absorbing members 52.

Each of the shock absorbing members 50 is formed in a quadrangular column that is hollow and has an elongated space 55N therein as illustrated in FIG. 3. Namely, each shock absorbing member 50 has a tubular shape. The shock absorbing members 50 are arranged on the plate surface of the plate member 30 such that an elongated direction of the shock absorbing members 50 is parallel to a longitudinal direction of the plate member 30. The rigidity of the exterior side shock absorbing members 51 may be relatively greater than the interior side shock absorbing members 52 by increasing a thickness or a length of the exterior side shock absorbing members 51 than the interior side shock absorbing members 52, for example. Each of the shock absorbing members 50 is made of metal such as aluminum. A nonwoven cloth 56 is disposed to cover each shock absorbing member 50 from an upper side (a roof panel 11 side) to reduce abnormal noise that occurs by contact between the shock absorbing member 50 and the roof panel 11.

The exterior side shock absorbing members 51a-51d and the interior side shock absorbing members 52a-52d having the same shape may exert technical effects described later. However, in this embodiment, the interior side shock absorbing members 52b-52d have a different shape from the exterior side shock absorbing members 51a-51d. The interior side shock absorbing members 52b-52d have a cross section of a substantially diamond shape according to a size or a shape of a space between the roof trim 20 and the roof panel 11 as illustrated in FIGS. 3 and 4.

The plate member 30 is a metal plate such as an iron plate and has rigidity greater than the shock absorbing members 50 (the exterior side shock absorbing members 51 and the interior side shock absorbing members 52). If the plate member 30 may be warped, load transfer performance to each of the shock absorbing members 50 is lowered. Therefore, the plate member 30 has predefined rigidity. The plate member 30 includes a rib 33 on the rear surface 30B. The rib 33 projects from the rear surface 30B and extends in the longitudinal direction of the plate member 30 between the exterior side shock absorbing members 51 and the interior side shock absorbing members 52.

The shock absorber 350 is bonded on the rear surface 20B of the roof trim 20 with hot melt such that a plate surface of the plate member 30 is along a plate surface of the roof trim 20 or the front surface 30A of the plate member 30 is opposite the rear surface 20B of the roof trim 20, as illustrated in FIGS. 4 to 6. Namely, the rear surface 30B of the plate member 30 including the shock absorbing members 50 faces the upward or the roof panel 11.

According to such a configuration, if the vehicle 1 receives shock or impact in case of a vehicle's collision, the plate member 30 receives a load from the vehicular interior side and the load is transferred dispersedly to the exterior side shock absorbing members 51 (51a-51d) and the interior side shock absorbing members 52 (52a-52d). Therefore, all of the shock absorbing members 50 are likely to collapse. The portion of the vehicle 1 near the outer edge (outer frame) 9 tends to include hard construction due to a vehicular structure. For example, a curtain shield air bag 8 is disposed in the outer edge 9 portion to protect the passenger P as illustrated in FIG. 4.

As illustrated in FIG. 5, the room trim 20 is bent downward to the vehicular interior side (lowered) as it extends to the vehicular front side due to a design of the ceiling surface. Therefore, a raising member 37 of a box shape is disposed on the front surface 30A side of the plate member 30 near the shock absorbing members 51a, 52a as illustrated in FIGS. 5 and 6. The vehicular front section of the shock absorber 350 is arranged on the rear surface 20B of the roof trim 20 via the raising member 37. Therefore, the load applied from the vehicular interior side can be transferred to the plate member 30 and further to the shock absorbing members 51a, 52a.

According to such a configuration, it is not necessary to mold the shock absorbing members 51a, 52a to have a different height from other shock absorbing members according to shapes of the roof trims 20 having different designs. All the shock absorbing members 50 may be formed in substantially the same shape.

According to the above shock absorbing structure, the shock absorber 350 includes multiple shock absorbing members 50 (51a-51d, 52a-52d) on the plate surface. Each of the shock absorbing members 50 is a relatively small piece. With such a configuration, all of the shock absorbing members are likely to collapse compared to a configuration including one large shock absorbing member.

The shock absorbing members 50 (51a-51d, 52a-52d) that are spaced from each other are arranged on the vehicular exterior surface 30B of the one plate member 30 and the plate member 30 is disposed on the roof trim 20 such that the plate surface of the plate member 30 is along the vehicular exterior surface 20B of the roof trim 20. With such a configuration, the load applied from the vehicular interior side can be surely transferred to each of the shock absorbing members 50 (51a-51d, 52a-52d) via the plate member 30 and sufficient shock absorbing effects can be obtained.

The technical effects can be remarkably exerted in the vehicular shock absorbing structure that is used on the vehicular ceiling 10. Near the vehicular ceiling, a space between the roof trim (a trim member) 20 that forms the vehicular interior surface and the roof panel (a vehicular panel) 11 that forms the vehicular exterior surface is relatively small. In such a configuration, the space near the vehicular ceiling is further reduced to keep a greater vehicular interior space.

If one single shock absorbing member is included in such a space near the ceiling, the shock absorbing member may be necessarily a large component sharing a large area and a part of the shock absorbing member may not collapse in response to the impact. In the vehicular shock absorbing structure of this embodiment, two or more shock absorbing members 50 (51a-51d, 52a-52d) are disposed on the plate member 30. Therefore, the impact load is dispersed by the shock absorbing members 50 in the plate surface direction of the plate member 30 and all of the shock absorbing members 50 almost evenly collapse and stable shock absorbing properties are exerted even in such a small space area between the roof trim 20 and the roof panel 11.

The plate member 30 includes the rib 33 and the plate member 30 including the shock absorbing members 50 (51a-51d, 52a-52d) can be reinforced. Therefore, the plate member 30 is less likely to be warped and the shock absorbing properties are improved. The structure tends to be harder as is closer to the vehicular outer edge 9 due to a vehicular structure. Therefore, the shock absorbing member that is arranged closer to the outer edge 9 preferably has higher shock absorbing properties. In this embodiment, the first shock absorbing members 51 (51a-51d) arranged closer to the outer edge 9 of the vehicle has relatively greater rigidity than the second shock absorbing members 52 (52a-52d). Accordingly, proper shock absorbing performance can be achieved.

The invention claimed is:

1. A shock absorber to be mounted on a vehicular exterior side of a trim member, the shock absorber comprising:
   a plate member having a plate surface and to be mounted on a vehicular exterior surface of the trim member such that the plate surface of the plate member is along the vehicular exterior surface of the trim member; and
   at least two or more shock absorbing members that are arranged on a vehicular exterior surface of the plate member to be spaced from each other along the plate surface of the plate member.

2. The shock absorber according to claim 1, wherein the plate member is to be mounted on the trim member of a roof.

3. The shock absorber according to claim 1, wherein the plate member further includes a rib.

4. The shock absorber according to claim 1, wherein
   the shock absorbing members include a first shock absorbing member and a second shock absorbing member,
   the first shock absorbing member is disposed on a vehicular exterior side and the second shock absorbing member is disposed on a vehicular interior side than the first shock absorbing member, and
   the first shock absorbing member has rigidity relatively greater than the second shock absorbing member.

5. The shock absorber according to claim 4, wherein
   the plate member has an elongated rectangular shape extending in a vehicular front-rear direction, and
   the plate member further includes a rib extending in an elongated direction of the plate member and between the first shock absorbing member and the second shock absorbing member.

6. The shock absorber according to claim 4, wherein
   the plate member has an elongated rectangular shape extending in a vehicular front-rear direction,
   the first shock absorbing member includes a first row of first shock absorbing members arranged in an elongated direction of the plate member,
   the second shock absorbing member includes a second row of second shock absorbing members arranged in the elongated direction of the plate member along the first row of the first shock absorbing members.

7. The shock absorber according to claim 6, wherein
   each of the first shock absorbing members and each of the second shock absorbing members has an elongated shape extending in the elongated direction of the plate member.

8. The shock absorber according to claim 6, wherein
   the first shock absorbing members included in the first row correspond to the respective second shock absorbing members included in the second row.

9. The shock absorber according to claim 4, wherein each of the first shock absorbing member and the second shock absorbing member has a tubular shape having a space therein.

10. The shock absorber according to claim 3, wherein the rib is between the at least two or more shock absorbing members and projects from the vehicular exterior surface of the plate member.

11. The shock absorber according to claim 4, wherein the plate member has rigidity greater than that of the first shock absorbing member and that of the second shock absorbing member.

* * * * *